United States Patent [19]

Hirohata et al.

[11] 4,452,521

[45] * Jun. 5, 1984

[54] CAMERA HAVING AN ELECTROMAGNETICALLY DRIVEN SHUTTER

[75] Inventors: Michio Hirohata; Hideo Ikari, both of Tokyo, Japan

[73] Assignee: Canon Kabushiki Kaisha, Tokyo, Japan

[*] Notice: The portion of the term of this patent subsequent to Aug. 2, 2000 has been disclaimed.

[21] Appl. No.: 381,785

[22] Filed: May 25, 1982

[30] Foreign Application Priority Data

Jun. 2, 1981 [JP] Japan .................................. 56-85421
Jun. 2, 1981 [JP] Japan .................................. 56-85422
Jun. 15, 1981 [JP] Japan .................................. 56-91877

[51] Int. Cl.³ ............................................. G03B 3/10
[52] U.S. Cl. ............................ 354/195.1; 354/234.1
[58] Field of Search ................. 354/25, 234, 235, 195

[56] References Cited

U.S. PATENT DOCUMENTS

| | | | |
|---|---|---|---|
| 3,762,299 | 10/1973 | Douglas | 354/235 |
| 4,209,242 | 6/1980 | Kitai et al. | 354/25 N |
| 4,348,094 | 7/1982 | Hirohata et al. | 354/234 |
| 4,396,267 | 8/1983 | Hirohata et al. | 354/25 |

Primary Examiner—Russell E. Adams
Attorney, Agent, or Firm—Toren, McGeady and Stanger

[57] ABSTRACT

A camera having a driving member to open and close shutter blades is operated to open a shutter by a force of a spring at a movement speed independently of that of a movable member at a time power is supplied to an electromagnetic driving source, the movable member operating to charge a second spring to return the shutter blade driving member, which second spring charges the first spring, the arrangement being such that the movable member can control the action of an automatic focusing mechanism.

5 Claims, 3 Drawing Figures

CAMERA HAVING AN ELECTROMAGNETICALLY DRIVEN SHUTTER

BACKGROUND OF THE INVENTION

1. Field of the Invention

The present invention relates to the shutter of a camera, and especially to a shutter wherein a plurality of shutter blades are driven by an electromagnetic force.

2. Description of the Prior Art

Heretofore, shutters have been made so that shutter blades which also operate as diaphragm blades are electromagnetically driven to gradually open an aperture, and so that when a predetermined amount of exposure is obtained, the shutter blades are quickly closed. Such a device is known, for example, from Japanese Laid-Open Patent Applications No. Sho 55-57832 and No. Sho 55-101924. However, this type of shutter has heretofore been provided with a coil at a sector ring to drive the shutter blades, and the sector ring is directly driven by the coil with an electromagnetic driving force generated within a magnetic field as power supplied thereto to open the shutter blades. Therefore, the force to open the shutter blades varies with the value of current supplied to the coil. Since copper wire used in the coil will vary in its resistance by about 0.4%/°C. depending upon the Joules of heat supplied thereto from a power source or due to a change in ambient temperature, the electromagnetically driven shutter develops shortcomings in that the driving force to open the shutter blades often varies causing adverse effects. Thus, the shutter opening characteristic cannot be maintained constant. Thus, it becomes difficult to always obtain the appropriate exposure.

SUMMARY OF THE INVENTION

It is the first object of the present invention to eliminate the above-mentioned shortcomings and to provide an electromagnetically driven shutter in which the aperture characteristic of the shutter will not vary due to the effect of temperature variations, etc., and so that an appropriate exposure can always be obtained.

The second object of the present invention is to provide an electromagnetically driven shutter in which a movable member of an electromagnetic device and a shutter blade driving member to open and close shutter blades are provided with the driving members being driven by the force of a spring.

A further object of the present invention is to provide a shutter so made that the electromagnetic device mentioned above can be utilized for control of starting and stopping of an automatic focus adjustment mechanism of a camera. This object is achieved by an arrangement wherein the automatic focus adjustment mechanism (hereinafter called the AF mechanism) is activated by the power supply to the electromagnetic device in association with the movable member of the electromagnetic device and an activation control member and a stopping control member for the AF mechanism, and wherein the AF mechanism is stopped by stopping this power supply. A stopping member, which is placed at a position to stop movement of the shutter blade driving member while the AF mechanism is in operation and is placed at a position to allow rotation of the driving member in association with the stopping of the AF mechanism, is provided so that the shutter blade driving member will undergo rotation following the movable member of the electromagnetic device by the force of a spring as power is supplied to the electromagnetic device for the second time.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
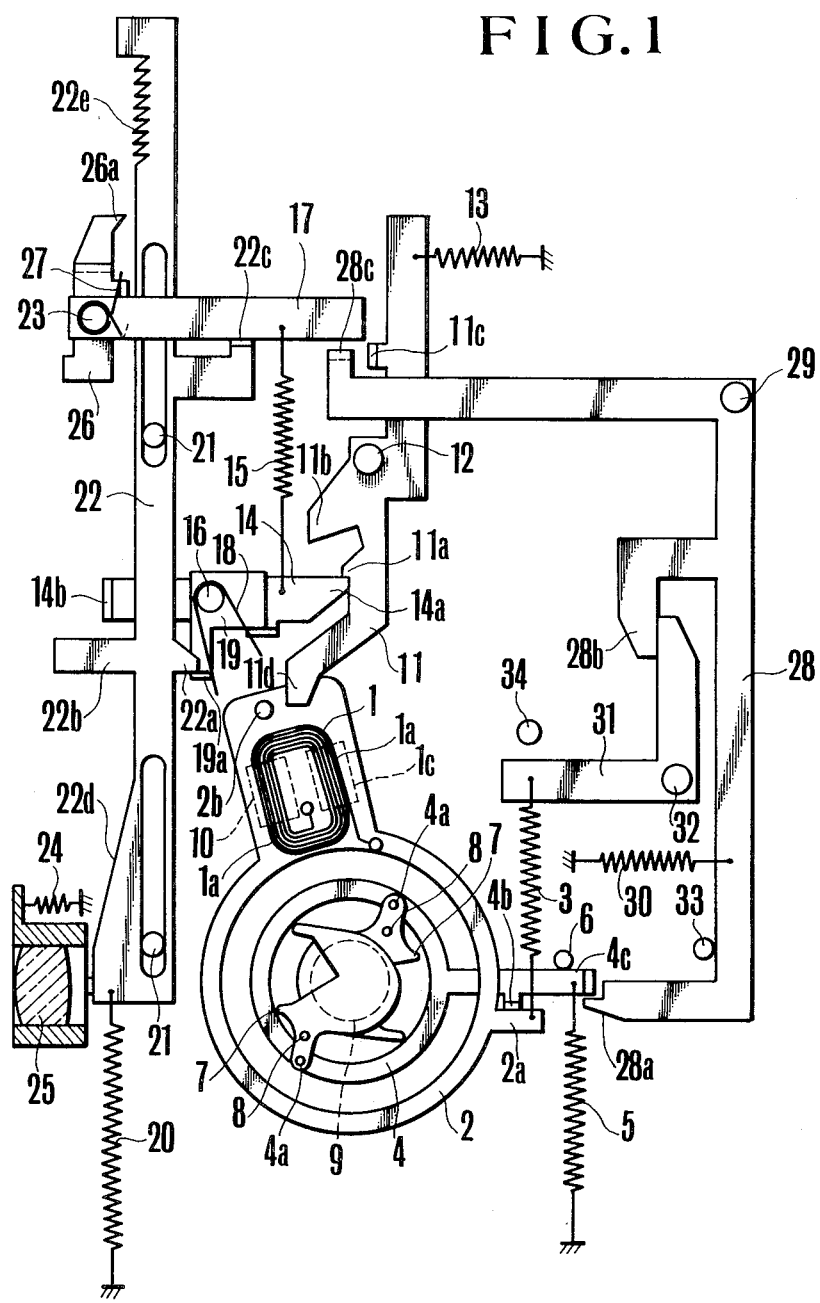
FIGS. 1, 2, and 3 are schematic diagrams, partially in section, depicting various examples of an electromagnetic driving device in accordance with the present invention.

In FIG. 1, there is shown a rotor 2 supported at a base plate (not shown) in a manner so as to be rotatable around an optical axis of a photo-taking lens (not shown), and a coil 1 is provided over the surface of the rotor 2. The coil 1 has both its ends connected to a control circuit (not shown), and has portions 1a parallel in the radial direction and placed within a magnetic field 10 formed by a permanent magnet and a yoke (not shown), so that a driving force is generated as power is supplied thereto to rotate the rotor 2 around the optical axis in the clockwise direction. A spring 3 operates to bias the rotor 2 in the counterclockwise direction, and one end thereof is coupled to a lever 31, to be described hereinafter. A sector ring 4 operates to hold and drive two shutter blades 7 which are supported at the base plate (not shown) in a manner to be rotatable around the optical axis. The shutter blades 7 are supported in a rotatable manner around a pin 8 on the base plate, and they are fitted with a pin 4a on the sector ring 4 for opening and closing an exposure aperture 9 following rotation of the sector ring 4 in a well-known manner.

An open spring 5 operates to bias the sector ring 4 in the clockwise direction. In the state shown in the drawing, the sector ring 4 is pulled by the open spring 5 and has its projection 4b engaged with an arm 2a of the rotor, and an arm 4c is pressed against a stopper 6 through the arm 2a by a return spring 3 which is stronger than the spring 5 and is stopped thereat so that the shutter blades 7 close the aperture 9.

A setting plate 22 constituting an AF mechanism is guided by a pin 21 provided at a fixed part of a camera and is supported in a slidable manner. A cam 22d is provided at a lower part thereof for shifting a photo-taking lens 25 for focus adjustment. A driving spring 20 operates to shift the setting plate 22 downward for focus adjustment, and a spring 24 operates to bias the photo-taking lens 25 in such a manner that the lens 25 is always engaged with the cam part 22d. A projection 22a operates to engage a claw part of an AF start lever 14 for checking the setting plate 22 at a start position. A ratchet tooth part 22e is provided for engagement with an AF stop claw 26. The stop claw 26 is supported in such a manner as to be rotatable around an axle 23 together with a transmission lever 17, and it is coupled with the lever 17 by a spring 27 and a projection 26b, whereby as the lever 17 is pulled by a spring 15 and engages with a projection 22c of the setting plate 22, a fore end 26a of the claw 26 is stopped at a position not engaging with the tooth part 22e.

An AF start lever 14 is supported coaxially together with a claw member 19 which engages with the above-mentioned projection 22a in a manner to be rotatable around a co-axle 16, and engages with the claw member 19 with its projection, and is further coupled therewith by a spring 18. The lever 14 is biased by the spring 15 around an axle 16 in the counterclockwise direction, and it checks the setting plate 22 at a position shown in the drawing by engagement with a projection 19a of the claw member 19, while a fore end 14a engages with a first fastening part 11a of a fastening lever 11. The fastening lever 11 is supported by an axle 12 in a rotatable manner and is biased by a spring 13 in the clockwise direction, engaging with the above-mentioned AF start lever 14 and being stopped thereat. An engaging projection 11c is adapted to be engaged with the above-mentioned transmission lever 17, and an operating arm 11d is adapted to be engaged with a control pin 2b on the rotor 2. Also, a second fastening part 11b is adapted to be engaged with the AF start lever 14.

A blocking lever 28 rotatable around an axle 29 has a fore end part 28a which engages with the arm 4c of the sector ring 4 to block its rotation and a projection 28c adapted to be engaged with the transmission lever 17, the lever 28 being also pulled by a spring 30 to abut on a pin 33 and to be stopped thereat. An adjustment lever 31 is supported rotatably around an axle 32 and has one arm coupled with one end of the above-mentioned return spring 3, the other end being engaged with an arm 28b of the lever 28, whereby the biasing force of the return spring 3 is varied following a rotation of the lever 28. A pin 34 operates to restrict rotation of the lever 31.

During operation, when a release button of a camera is pressed down with the above-described mechanism in the state shown in FIG. 1, a range finding device (not shown) is actuated to detect the distance to an object. After that, as a control circuit causes current to flow from an inside end to an outside end of the coil 1, an electromagnetic driving force is generated as mentioned above, and the rotor 2 rotates in the clockwise direction while biasing the return spring 3. Then the driving pin 2b presses the operating part 11d of the fastening lever 11. Also, while the engagement between the projection 2a of the rotor 2 and the pressing part 4b of the sector ring 4 is released by rotation of the rotor 2, the arm part 4c of the sector ring 4 engages with the fore end 28a of the blocking lever 28 at this time, and therefore the sector ring 4 will not rotate and the shutter blades 7 also will not work.

Now, as the driving pin 2b presses the operating part 11d of the fastening lever 11, the fastening lever 11 rotates in the counterclockwise direction to release the engagement between the fore end 14a of the AF start lever 14 and the first fastening part 11a and, at the same time, it places the engaging projection 11c within an operating area of the transmission lever 17. At this time, the start claw 19 rotates in the counterclockwise direction together with the AF start lever 14 by the biasing force of the spring 15, and therefore the bent part 19a thereof is released from engagement with the projection 22a of the setting plate 22, and the setting plate 22 starts shifting downward by the biasing force of the spring 20. At this time, the fore end of the AF start lever 14 abuts on the second fastening part 11b of the fastening lever 11 and stops thereat. The photo-taking lens 25 is pulled in by the spring 24 along the cam 22d of the setting plate 22. On the other hand, the arm 22c also releases retention of the transmission lever 17 by the shifting of the setting plate 22, whereby the AF stop lever 26 rotates in the clockwise direction by the biasing force of the spring 15 transmitted through the transmission lever 17, and its rotation is stopped at a position at which the end of the transmission lever 17 engages with the engaging projection 11c of the fastening lever 11. After that, when the photo-taking lens 25 is pulled in by the shifting of the setting plate 22 to a position correponding to the object distance detected by the range finding device, the power supply from the control circuit to the coil 1 is discontinued. Therefore, when the photo-taking lens comes to an in-focus position, the rotor 2 makes a return movement by the biasing force of the spring 3 in the counterclockwise direction rotating the fastening lever 11 in the clockwise direction by the force of the spring 13, thus releasing the engagement between the transmission lever 17 and the engaging projection 11c. Therefore, the transmission lever 17 and the AF stop lever 26 are rotated by the biasing force of the spring 15 until the claw part 26a of the AF stop lever 26 and the tooth part 22e of the setting plate 22 engage with each other, stopping the shifting of the setting plate 22 and, at the same time, the end part 28c of the blocking lever 28 is pushed by the transmission lever 17 to rotate the lever 28 against the biasing force of the spring 30. By this, the adjustment lever 31 is also rotated around a supporting axle 32 in the clockwise direction to increase the biasing force of the spring 3 and, at the same time, the engagement between the arm part 4c of the sector ring 4 and the fore end 28a of the blocking lever 28 is released. The operation described above completes the AF action.

Now, when this AF action is completed, the control circuit provides power supply to the coil 1 to again rotate the rotor 2 in the clockwise direction, but as the claw part 14a of the AF start lever 14 and the second fastening part 11b of the fastening lever 11 engage with each other, the operating part 11d of the fastening lever 11 retreats from an operating area of the driving pin 2b, and thus the fastening lever 11 will not affect the rotation of the rotor 2, and the rotor 2 rotates by an electromagnetic force while charging of the spring 3 is effected in the meantime. On the other hand, since the sector ring 4 is not checked by the blocking lever 28 at this time, the sector ring 4 rotates in the clockwise direction by the biasing force of the spring 5 following the rotor 2 with a slower speed than that of the rotor 2. Therefore, the shutter blades 7 also rotate around the supporting axle 8 to initiate an exposure and, at the same time, an exposure control circuit (not shown) starts measuring the amount of incident light. After that, as the exposure control circuit detects a prescribed degree of exposure, the control circuit cuts the power supply to the coil 1. Since the biasing force of the spring 3 is sufficiently larger than the biasing force of the spring 5 at this time, the projection 4b of the sector ring 4 will receive a strong returning force in the counterclockwise direction from the arm part 2a of the rotor 2. Therefore, the sector ring 4 has its direction of movement suddenly reversed when the power supply to the coil 1 of the rotor 2 is stopped to close the shutter blades 7. A shutter time control with a high speed can be accomplished by such arrangement. Also, the spring 5 which biases the shutter blades in an opening direction is charged by the force of the spring 3 as the rotor 2 returns.

Also, when a photo-taking operation has been completed as mentioned above, an associating member of a charging mechanism (not shown) engages with an arm 22b of the setting plate 22 to push the setting plate 22 upward resisting the spring 20, and the arm 22b pushes an end part 14b of the AF start lever 14 to rotate the lever in the clockwise direction to have the claw member 19 engaged with the projection 22a. At the same time, the end 14a of the lever 14 and the first fastening part 11a of the fastening lever 11 are engaged together. By this, the setting plate 22 is checked at its initial position. At this time, the operating arm 11d of the fastening lever 11 returns to within an operating path of the pin 2b of the rotor. Also, as the arm 22c of the setting plate rotates the transmission lever 17 in the counterclockwise direction, the blocking lever 28 rotatively returns in the clockwise direction by the force of the spring 30, and the fore end 28a thereof assumes a position where it is able to block the rotation of the sector ring 4, thereby completing preparation for a next photographing operation.

Figure 2:
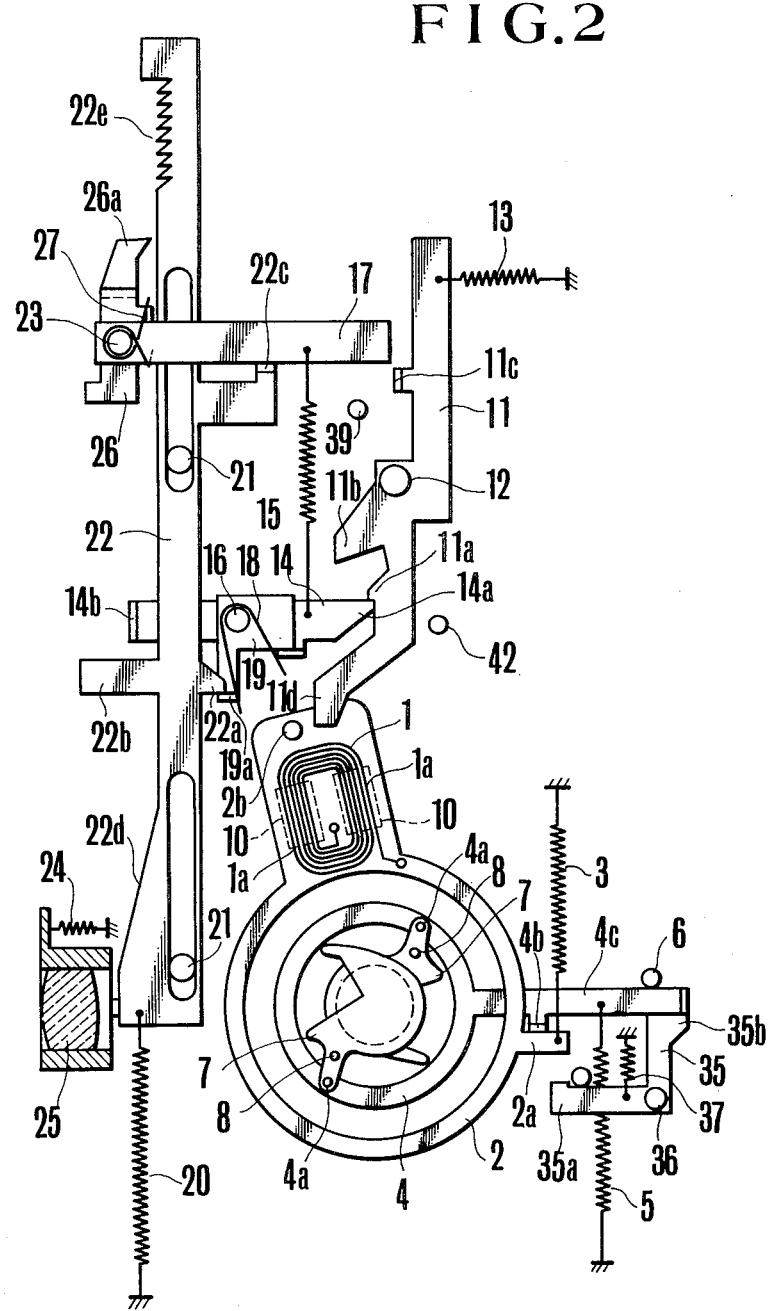

FIG. 2 shows another example of the present invention wherein the same members are shown with the same identification numbers as in FIG. 1.

In this example, in place of the blocking lever 28 of the preceding example, a member is provided to restrict rotation of the rotor through the fastening lever 11 at the time of a first power supply and a release lever is provided which releases checking of the sector ring by the rotor at the time of a second power supply.

A release lever 35 having an arm 35b engaging with the arm 4c of the sector ring 4 is axially supported in a manner to be rotatable around an axle 36, and further is biased by a spring 37 to hold the sector ring 4 at a position at which the other arm 35a thereof abuts on the stopper. A pin 42 operates to restrict rotation of the fastening lever 11, and a pin 39 operates to restrict rotation of the transmission lever 17.

In this example, when the rotor 2 is rotated by a first power supply to the coil 1, the driving pin 2b and the operating part 11d of the fastening lever 11 engage with each other, and the fastening lever 11 rotates until it abuts on the restricting pin 42. By this rotation of the fastening lever 11, the engagement between the claw part 14a of the AF start lever 14 and the first fastening part 11a is released, and the setting plate 22 starts its operation to shift the photo-taking lens 25 as mentioned above. Here, the rotation of the rotor 2 at this time will be stopped at a position before the projection 2a thereof engages with the end part 35a of the restricting lever 35 by the engagement of the fastening lever 11 and the restricting pin 42, and thus the sector ring 4 will not rotate to release the shutter blades at this time. After this, as a power supply to the coil 1 is stopped, the rotor 2 makes a reverse rotation. Therefore, the engagement between the projection 11c of the fastening lever 11 and the transmission lever 17 is released as mentioned above, and the claw part 26a of the AF stop lever 26 engages with the tooth part 22e of the setting plate 22 to stop the shifting of the setting plate 22, thus completing the AF action. Also, since the claw part 14a of the AF start lever 14 and the second fastening part 11b of the fastening lever 11 engage with each other at this time, the operating part 11d thereof retreats from an operating area of the driving pin 2b of the rotor 2. Therefore, as power supply to the coil 1 is again effected and the rotor 2 rotates, the driving pin 2b and the operating part 11d will not engage with each other, and the rotor 2 pushes the arm 35a of the release lever 35 with its projection 2a to rotate the lever 35 in the counterclockwise direction. Since the engagement between the arm part 4c of the sector ring 4 and the end part 35b of the release lever 35 is released thereby, the sector ring 4 can follow the rotation of the rotor 2 by the force of the spring 5 and release the shutter blades 7. After this, an exposure value reaches a prescribed level and power supply is stopped and the shutter blades 7 are closed. Since arrangements and operations other than what is described above are the same as those of the preceding example, explanation thereof will be omitted.

Figure 3:
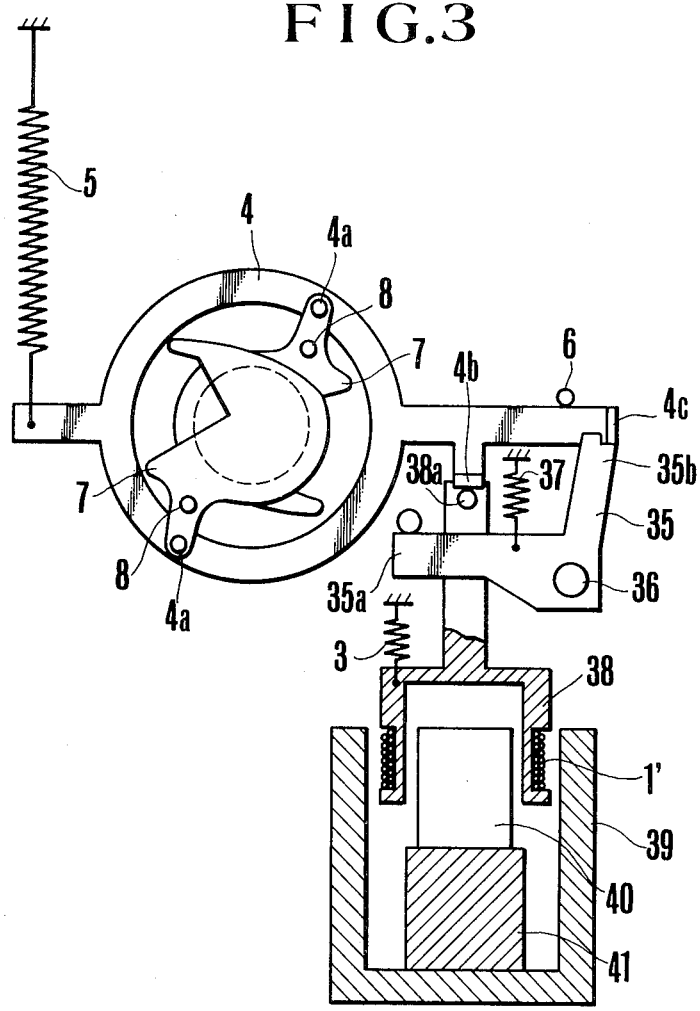

FIG. 3 shows an example of a shutter in which an electromagnetic driving source of a plunger type is used in place of the electromagnetic driving sourde of a rotary type as in the above-mentioned examples.

In FIG. 3, a yoke 39, a pole piece 40, and a permanent magnet 41 are components which form a tubular magnetic field within an operating area of the coil 1. A plunger 38 has a coil 1' wound therearound, and a pin 38a engaging with the projection 4b of the sector ring 4 is provided at an end of the plunger 38. The sector ring 4, the release lever 35, and other like parts are formed in the same manner as in the example of FIG. 2, wherein when power is supplied to the coil 1', the plunger 38 shifts downward as seen in the drawing resisting the spring 3, and the pin 38a pushes one arm of the release lever 35 to rotate the lever 35 in the counterclockwise direction resisting the spring 37. Therefore, the checking of the sector ring by fore end 35b is released and the sector ring 4 rotates in the clockwise direction by the force of the spring 5 whereby the shutter blades are gradually opened, as in the case in FIG. 2. When a required degree of exposure is obtained, the power supply to the coil 1' is stopped by the control circuit, and then the plunger 38 is pulled upward as seen in the drawing by the force of the spring 3 to push the projection 4b of the sector ring 4 by the pin 38a to quickly rotate the ring 4 in the counterclockwise direction resisting the spring 5 to close the shutter blades. When the arm of the sector ring comes in contact with the stopper 6 and stops there, the release lever 35 is pulled by the spring 37 and rotates in the clockwise direction whereupon the fore end 35b thereof engages with the fore end 4c of the sector ring 4 and the condition shown in FIG. 3 is resumed.

While in this example there is shown an arrangement wherein the shutter blades are driven by the sector ring 4 which rotates around the optical axis, the driving member for the shutter blades is not necessarily limited to such a ring-shaped element, and instead it could be a lever which can rotate around an axis, or a sliding plate which can shift in a linear manner.

The present invention has provided therein, as mentioned above, a movable member for an electromagnetic driving source, a shutter blade driving member independent of said movable member, a shutter release spring to bias said driving member in a shutter opening operation, and a return spring which is charged by the movement of said movable member when power is supplied to a coil and which return the driving member to a shutter closing position through the movable member when the power supply is stopped. The arrangement is such that the release spring is charged at the time of return, and therefore a shutter can be provided in which an electromagnetic device is used as a driving source without the driving power thereof varying due to temperature variations and wherein the aperture characteristic is maintained constant.

Also, according to the present invention, initiation and stopping of an automatic focusing mechanism can be controlled by utilizing the above-mentioned arrangement, and thus an electromagnetic device for the automatic focusing mechanism does not have to be provided separately, thereby simplifying the structure of the camera.

While specific embodiments of the invention have been shown and described in detail to illustrate the application of the inventive principles, it will be understood that the invention may be embodied otherwise without departing from such principles.

What is claimed is:

1. A camera with an electromagnetically driven shutter, comprising:
   a plurality of shutter blades;
   a rotatable shutter blades driving member to open and close said shutter blades;
   a shutter opening spring to operate said shutter blades driving member from a shutter closing position to a direction to open the shutter;
   an electromagnetic driving source having a movable member, said movable member being structured as a rotor rotatable coaxially with said shutter blades driving member and having a coil to effect rotation thereof towards a direction to open the shutter at the time power is supplied to said coil; and
   a return spring to retain the shutter blade driving member at a shutter closing position through said movable member when power is not supplied to said electromagnetic driving source;
   wherein said shutter blades driving member operates in a direction to open said shutter by the force of said shutter opening spring independently of the movable member when power is supplied to the electromagnetic driving source; and
   wherein said movable member of the electromagnetic driving source charges the return spring by its movement at a time power is supplied to the electromagnetic driving source and returns to a shutter closing position by the force of said return spring driving the shutter blade driving member along therewith when the power supply is stopped, said shutter opening spring being charged at that time.

2. A camera according to claim 1, which further comprises:
   an automatic focusing mechanism;
   a control member provided at said movable member for controlling operation of said automatic focusing mechanism; and
   blocking means for blocking operation of said shutter blade driving member;
   said movable member being operable to rotate through a specific angular distance when current is first supplied to said coil so as to start operation of said automatic focusing mechanism by means of said control member;
   said blocking means operating to block operation of said shutter blades driving member during operation of said automatic focusing mechanism, said movable member being rotated through an angular distance equal to said specific angular distance when current is subsequently supplied to operate said shutter blades driving member.

3. A camera according to claim 2, further comprising:
   fastening means for retaining said automatic focusing mechanism at its initial position; and
   stop means for stopping the automatic focusing mechanism;
   wherein said fastening means has an operating part to receive the action of said control member for releasing the retention of said automatic focusing mechanism at a time power supply is first applied to the electromagnetic driving source, said operating part retracting to a position not engaging with the control member at a second application of power supply to said electromagnetic driving source.

4. A camera according to claim 3, wherein said blocking means releases blocking of said shutter blade driving member in association with said stop means when said automatic focusing mechanism is stopped.

5. A camera according to claim 1 which further comprises:
   an automatic focusing mechanism;
   a control member provided at said movable member for controlling operation of said focusing mechanism; and
   blocking means for blocking operation of said shutter blades driving member;
   wherein said movable member rotates with the first occurrence of current supply to said coil so as to start operation of said automatic focusing mechanism by means of said control member, said blocking means blocking operation of said shutter blade driving member during operation of said automatic focusing mechanism, said movable member operating to rotate through a larger angular distance during a second current supply than during a first current supply so as to release the blocking of the blocking means and start operation of said shutter blades driving member.

* * * * *